United States Patent [19]

Harrison

[11] Patent Number: 4,879,880
[45] Date of Patent: Nov. 14, 1989

[54] AIR TEMPERATURE REGULATOR

[76] Inventor: Frank Harrison, P.O. Box 1824, Kansas City, Mo. 64141

[21] Appl. No.: 297,102

[22] Filed: Jan. 17, 1989

[51] Int. Cl.$^4$ .............................................. F25D 17/04
[52] U.S. Cl. ...................................... 62/406; 62/530; 165/86
[58] Field of Search ...................... 62/406, 530; 165/86

[56] References Cited

U.S. PATENT DOCUMENTS

| | | | |
|---|---|---|---|
| 662,541 | 11/1900 | Miskolczy | 62/406 |
| 664,776 | 12/1900 | Porter. | |
| 702,994 | 6/1902 | Porter. | |
| 1,260,194 | 3/1918 | Higgins. | |
| 1,667,944 | 5/1928 | Nichols. | |
| 1,858,226 | 5/1932 | Hlavaty. | |
| 1,869,855 | 8/1932 | LeGrand. | |
| 1,903,471 | 4/1933 | Murphy. | |
| 2,501,038 | 3/1950 | Fransson. | |
| 2,650,803 | 9/1953 | Rosskopf. | |
| 2,720,013 | 10/1955 | Clarke | 416/146 R |
| 2,982,522 | 5/1961 | Hamilton et al.. | |
| 3,020,025 | 8/1957 | O'Mara. | |
| 3,253,649 | 5/1966 | Laing. | |
| 3,285,330 | 11/1966 | Root 3rd. | |
| 3,612,168 | 10/1971 | Peterson | 165/86 |
| 3,738,771 | 6/1973 | Delarbre et al. | 416/96 |
| 4,326,833 | 4/1982 | Zelahy et al. | 416/96 |
| 4,751,827 | 6/1988 | Villarreal | 62/406 |
| 4,761,314 | 8/1988 | Marshall | 62/530 X |

FOREIGN PATENT DOCUMENTS

| | | | |
|---|---|---|---|
| 943379 | 10/1948 | France. | |
| 58-224242 | 6/1982 | Japan. | |
| 150740 | 9/1982 | Japan | 62/406 |

Primary Examiner—Lloyd L. King
Attorney, Agent, or Firm—Hovey, Williams, Timmons & Collins

[57] ABSTRACT

An air temperature regulator is especially useful for cooling an airstream generated by an electric fan while permitting a portion of the airflow to flow substantially uninhibited to a user. The air temperature regulator utilizes at least one individual cell containing a phase-change material which has been chilled which is placed into a housing. The housing includes a mechanism for extracting the cell from its receiver so that the cell may be removed from the housing and refrozen. The extractors are mounted within a grille adjacent a track whereby extracted cells will prolapse to a collection bag at the bottom of the housing for refreezing and recycling.

10 Claims, 2 Drawing Sheets

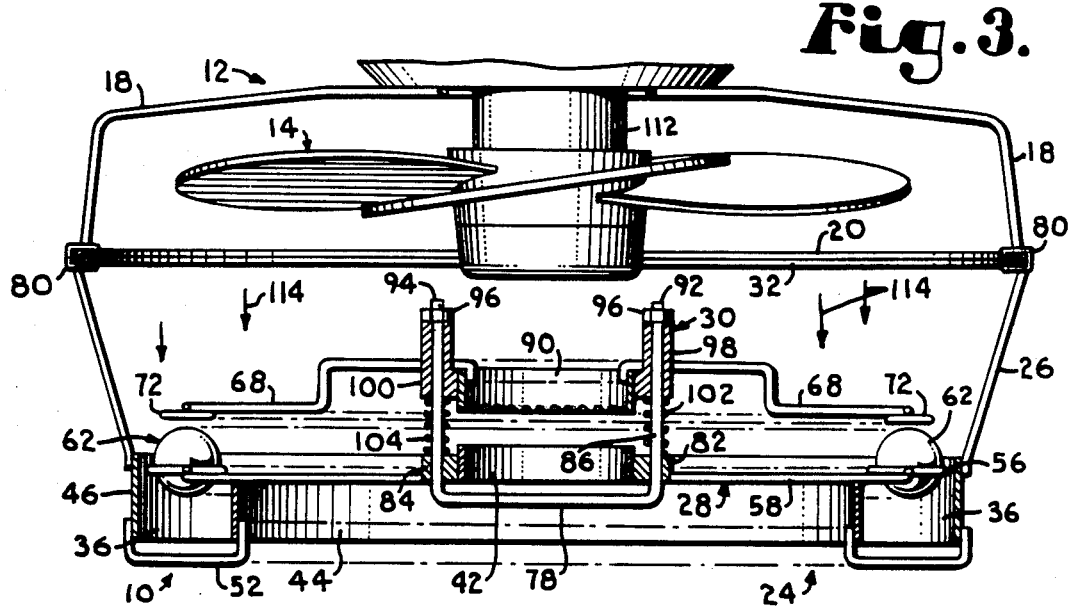
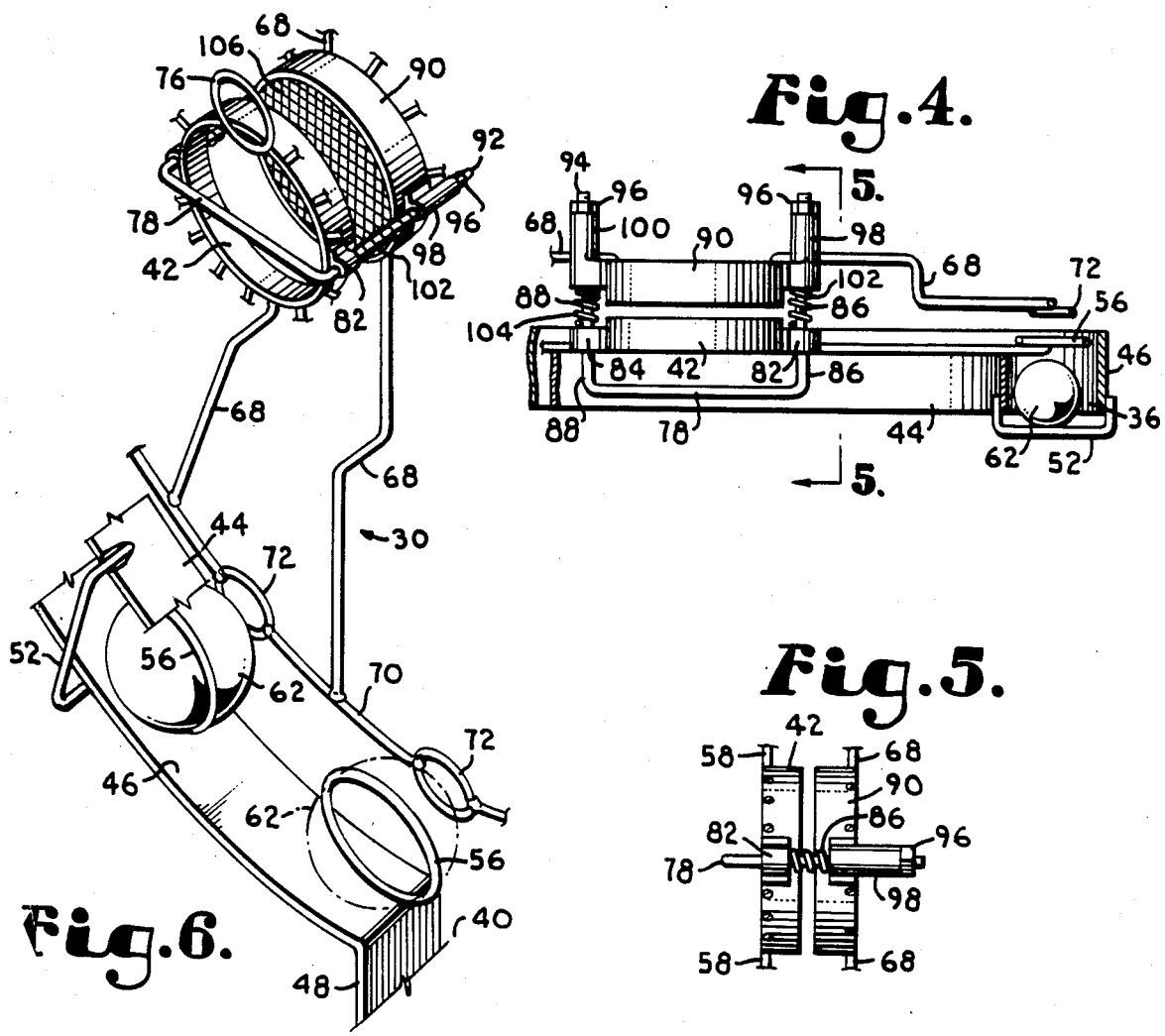

AIR TEMPERATURE REGULATOR

BACKGROUND OF THE INVENTION

1. Field of the Invention

An air temperature regulator is provided which effectively converts a conventional electric fan to an air cooling device which is especially useful in generating a supply of cooled air to a specific location. Yet further, it is economical to produce, simple to operate, and does not detract from the original, airstream generating characteristics of the fan with which it is used. More particularly, it is concerned with an air temperature regulator which employs a modified housing at the downstream side of a conventional electric fan to releasably hold a cell containing a phase-change material, or plurality of individual cells, in the airstream of a conventional electric fan, and includes a mechanism for extracting the cells from the fan so that they may be rechilled and recycled.

2. Description of the Prior Art

Sweltering summers pose an ever-present threat to the comfort and health of many people. One solution to the high heat inside residential structures is conventional air conditioning, where the air within the entire structure or a specific room is cooled and dehumidified in a conventional refrigeration cycle. Unfortunately, some individuals on more limited incomes are often confronted with the inability to afford air conditioning of large volumes of air. Typically, air conditioners are somewhat expensive to purchase and to operate, and are somewhat inefficient in that they may cool more air than is necessary to accommodate the needs of the occupant of the structure. For those on limited incomes, cooling must be economical to be practical.

One well recognized method of making an occupant more confortable is the use of a fan. Conventional electric fans do not cool the air itself but do cause the air to move so that the airstream so generated produces a cooling effect on the user.

As a result, various attempts have been made to utilize a conventional electric fan to not only circulate air, thus providing a cooling effect, but also serve as an airstream source across a chilled surface. Unfortunately, these past efforts have largely been ineffective in both providing a cooling stream of air to reach the recipient while also enabling an ordinary user to quickly and efficiently recycle the cooling medium as it absorbs heat. It is especially desirable to provide an air temperature regulator which can be easily and economically retrofitted to an existing electrical fan or to be economically produced as part of an entire unit.

SUMMARY OF THE INVENTION

The problems outlined above are in large measure solved by the air temperature regulator in accordance with the present invention. The air temperature regulator hereof is easily adaptable to a variety of conventional electric fans, and enables a cell containing a phase-change material for cooling the air to be quickly and efficiently removed, chilled, and reinserted. Yet, further, cells containing the phase change materal, preferably water, are already commercially available and sold in variety stores as substitutes for conventional ice cubes. Thus, the present invention requires a minimum of additional components, having the ability to utilize existing electrical fans and cells which are already commercially available.

The air temperature regulator in accordance with the present invention broadly includes a hollow cell containing a phase-change material and a housing adapted for mounting on an electric fan, the cell being releasably secured within the housing and held in the airstream of the fan to thereby cool the airstream as it passes by. The housing includes motive means for selectively releasing the cell from the housing. Preferably, a number of individual cells are arranged peripherally around the airstream so that a portion of the airstream generated by the fan passes through the housing substantially uninterrupted.

More particularly, the temperature controlling apparatus includes a track within the housing whereby individual cells may be loaded into the track from the top of the housing and pass therearound until manually inserted into receivers within the housing. Corresponding extractors are aligned with the receivers for extracting the cells from the receivers upon shifting of the extractor relative to the receiver. The cells, once extracted from the receivers, roll down the track until they fall downward through an exit aperture in the housing and into a collector position underneath.

The cells are preferably small resilient plastic spheroids containing a phase-change material such as water, which enable the air generated by the fan to pass therearound and gradually absorb heat from the passing air. When the phase-change material within the cell is sufficiently warmed, each cell is simultaneously extracted from its receiver, collected, and returned to, e.g., a freezer for chilling and subsequent recycling.

BRIEF DESCRIPTION OF THE DRAWING

FIG. 3 is a fragmentary horizontal sectional view generally along the line 3—3 of FIG. 3 showing the placement of the cells within the receivers in the airstream of the fan and the extractor unit positioned across from the receivers;

FIG. 4 is a fragmentary horizontal sectional view similar to FIG. 3 showing the location of a cell within the track after extraction from its receiver;

FIG. 5 is a fragmentary vertical sectional view along line 5—5 of FIG. 4 showing the shiftable extractor hub pulled toward the securing hub by the handle, both hubs being in alignment;

FIG. 6 is a fragmentary perspective view of the air temperature regulator hereo, showing a portion of the arcuate track for positioning the cells adjacent the receivers and, following extraction, permitting them to pass downwardly to an exit aperture;

DESCRIPTION OF THE PREFERRED EMBODIMENT

Figure 1:
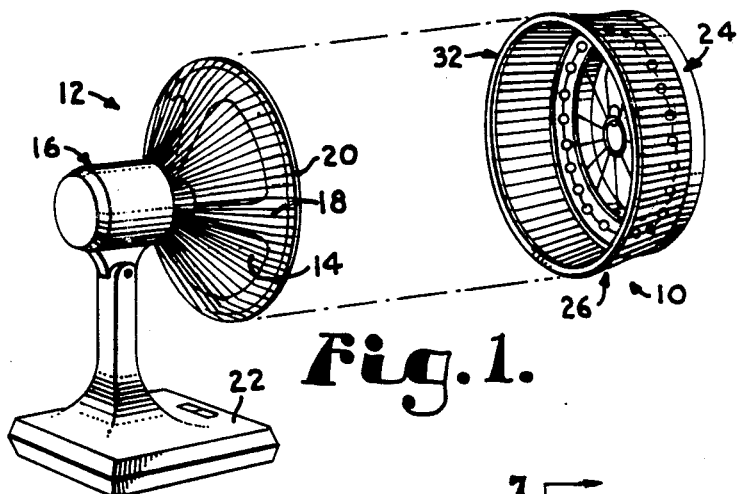
FIG. 1 is a perspective view of the air temperature regulator hereof shown prior to attachment to a conventional electric fan which has had its ordinary front grille removed.

Referring now to the drawing, a temperature controlling apparatus 10 is adapted for mounting on a conventional electric fan 12. The fan 12 generates a stream of air forwardly and in the direction of the temperature controlling apparatus 10 when propeller 14 is rotated by motor 16. Fan 12 includes a rear grille 18 extending forwardly from the housing of motor 16, the grille terminating in a circumferential rim 20 positioned just forward of the plane defined by the path of the forward edge of the propeller 14 during its rotation. Fan 12 also includes a base 22 which includes electrical switches for controlling the operation of the motor and provides a stable base for the fan 12 during rotation. Moreover, the base 22 serves to elevate the motor 16 and propeller 14 so that they are spaced somewhat above the supporting surface under the base.

Temperature contoolling apparatus 10 includes a housing 24 including a grille 26 which extends forwardly from the rim 20 and ends in a rearwardmost ring 32 which substantially conforms in diameter to rim 20 for attachment thereto.

Figure 2:
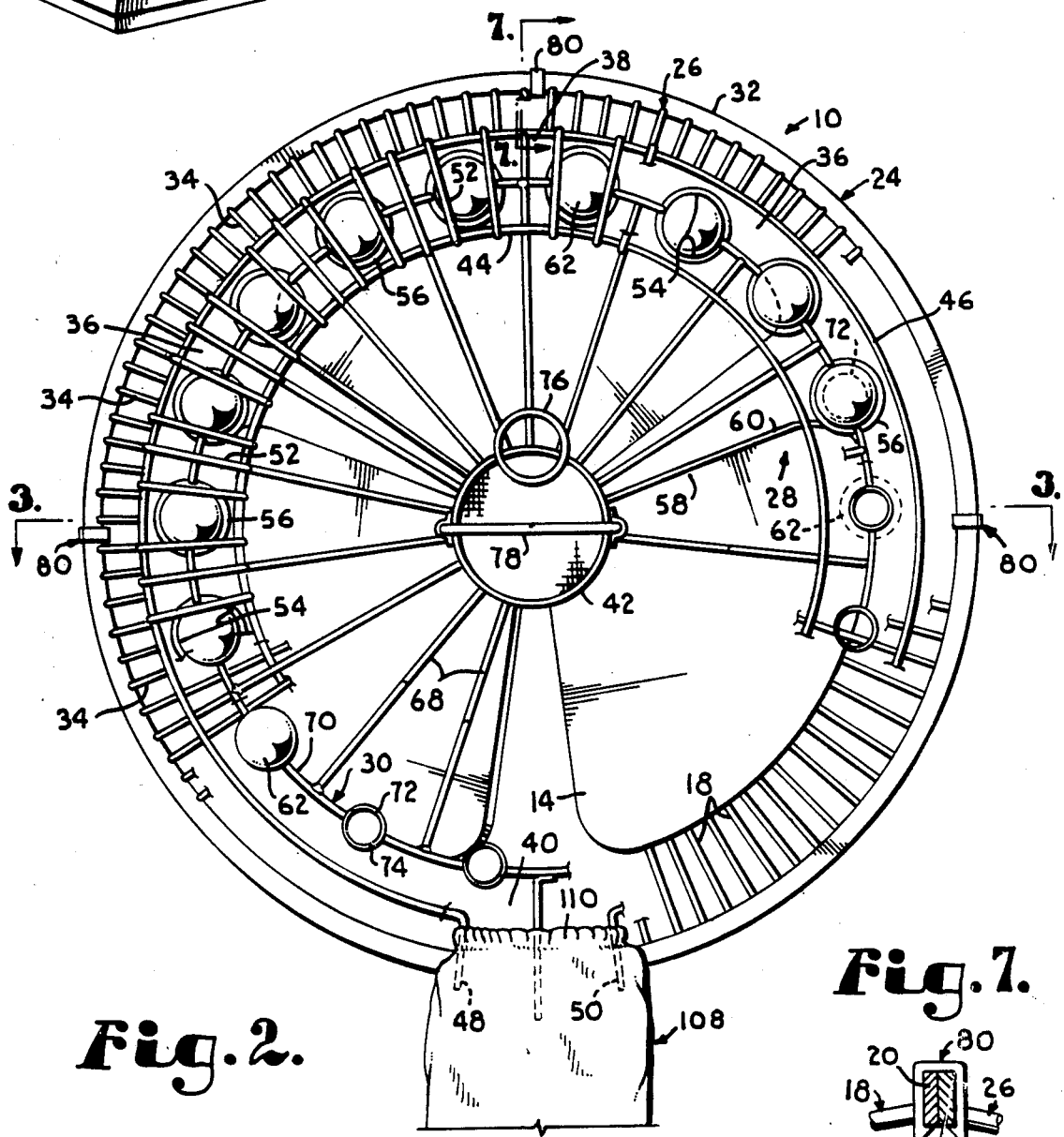
FIG. 2 is a fragmentary front elevational view of the air temperature regulator hereof with portions of the front grille, some of the cells, some of the receivers, and a portion of the collection bag removed to show various parts of the air temperature regulator hereof.

Turning now to FIG. 2, housing 24 has as its rearwardmost portion ring 32, with grille 26 extending forwardly therefrom. Grille 26 is formed from a series of radially extending wires 34 secured to the ring 32 and radiate inwardly from ring 32 to form a protective barrier in front of the rotating propeller 14. Wires 34 are preferably joined to rim 32 by soldering, welding, adhesive or other thermal or chemical bonding. The grille may be made of plastic or metal.

An arcuate track 36 is located within grille 26 and is part of housing 24 of temperature controlling apparatus 10. The track 36 includes an inlet opening 38 at the top of the track 36 and a exit aperture 40 at the bottom of the track 36. Track 36 is spaced radially outwardly from securing hub 42 and is formed of the circumferentially extending inner band 44 which surrounds securing hub 42 and an outer band spaced radially outwardly from inner band 44 and extends substantially around track 38 till reaching exit aperture 40. Both bands 42 and 44 are configured as elongated, arcuate strips having the same radius of curvature. Outer band 46 terminates in two downwardly depending bag spreaders 48, 50. Each of the bag spreaders 48, 50, while extending substantially downward, are angled somewhat from the vertical in order to support a collection bag thereon. Inner band 44 and outer band 46 are joined together by a plurality of radially aligned spaced wire legs 52, which, with wires 34, form grille 26. Wire legs 52 are spaced apart, and at preselected intervals are spaced somewhat more widely to define openings 54 therebetween.

Receivers 56 are positioned by receiver arms 58 to align with openings 54. Receiver arms 58 are attached to securing hub 42 and extend radially outward and terminate in receiver 56. Receiver 56 is substantially circular in configuration while receiver 56 and receiving arm 58 are preferably formed of a single, continuous wire 60. Receiver 56 is sized to receive a cell in compression fit therein.

Figure 8:
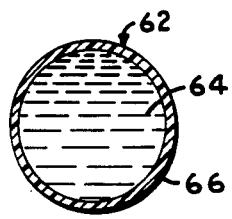
FIG. 8 is a sectional view of the cell hereof containing phase-change material.

As shown in FIG. 8, an individual cell 62 is provided which includes phase-change material 64, such as water, within a hollow cell wall 66. Each cell 62 is preferably spherical and cell wall 66 is formed of a resilient material such as synthetic rubber or other thermoplastic material, whereby cell 62 may be deformed in order to be in a compression fit within receiver 56. Thus, the inside diameter of receiver 56 is slightly smaller than the outside diameter of cell 62. Openings 54 are of an insufficient size to permit cell 62 from passing therethrough, but are sufficient to enable a human digit to pass therein for pressing of a cell 62 into a corresponding receiver 56. Similarly, wire legs 52 defining inlet 38 are spaced sufficiently far apart to permit a cell 62 to be loaded therein from the top, but are angled inwardly from top to bottom toward securing hub 42 so that cell 62 will not escape through opening 38 but will rather pass along track 36 until positioned adjacent and placed in the desired receiver 56.

Housing 24 also includes cell extractor unit 30 which has a series of radially extending spokes soldered or welded to loop 70. A series of extractors 72 are spaced along loop 70 in alignment with receivers 56. Loop 70 extends entirely around track 36 and is located behind receiver 56 and wire legs 52 for positioning extractors 72 in alignment with receivers 56 as well as aiding in preventing cells 62 from moving rearwardly out of track 36. Extractors 72 are in the form of wire loops 74 or small discs of a smaller diameter than the entire diameter of the receivers 56 so that the extractors 72 may pass in a path directed toward the interior of receiver 56 to extract the cell 62 therefrom.

A thumb rest 76 is mounted on securing hub 42 for use in conjunction with handle 78 which projects forwardly of securing hub 42 for purposes as will be explained herein. Housing 24 is secured to fan 12 by a series of clips 80 which hold ring 32 adjacent rim 20, as shown in greater detail in FIG. 7.

Turning now to FIG. 3, temperature controlling apparatus 10 is mounted to fan 12 by clips 80 selectively spaced around rim 20 and ring 32. In FIG. 3, a portion of the grille has been removed to more clearly show the cell securing unit 28 and the cell extractor unit 30. Cell securing unit 28 includes securing hub 42, receiver arm 58 and receiver 56. Securing hub 42 includes a pair of laterally spaced bushings 82, 84 in substantially the same horizontal plane and diametrically opposed on the exterior of securing hub 42. The bushings 82, 84 are apertured to permit rearwardly extending stems 86, 88 of handle 78 to slide therethrough and thus permit cell extractor unit 30 to shift relative to cell securing unit 28.

Cell extractor unit 30 includes extractor 72, handle 78, spoke 68 and extractor hub 90 to which the spokes are connected. Rearwardly extending stems 86, 88 of handle 78 are threaded at their respective ends 92, 94 for receiving nuts 96 threadably thereon. Extractor hub 90 is provided with a pair of ears 98, 100 mounted thereon and substantially aligned with bushings 82, 84 of securing hub 42. Stems 86 and 88 extend through the ears 98, 100 and a pair of coil springs 102, 104 are mounted on stems 86, 88 for biasing securing hub 42 and extractor hub 90 apart.

As shown in FIG. 3, cells 62 are mounted in receivers in a snug, compression fitting. As shown in FIG. 4, the handle 78 may be drawn forwardly with respect to the orientation of the fan 12, whereby extractors 72 are shifted forwardly and serve to urge cells 62 out of the snug fitting within the receiver 56. In this operation, springs 86, 88 are compressed so that when handle 78 is released springs 86, 88 urge extractor hub 90 rearwardly while securing hub 42 remains in substantially fixed relationship relative to housing 24 and fan 12. After extraction, cell 62 is in track 36 formed by inner band 44, outer band 46, wire leg 52 and wire 34 (not shown)

in FIGS. 3 and 4, and thereafter prolapses in an arcuate direction substantially transverse to the airflow 114, to move along track 36 to exit aperture 40.

In FIG. 5, extractor hub 90 is shown shifted forwardly relative to securing hub 42. Coil spring 86 is compressed while handle 78 is drawn forwardly so that extractor hub 90 will shift rearwardly when handle 78 is released by the user.

This relationship is also illustrated in the perspective view shown in FIG. 6. Each of the extractors 72 are shown aligned with their corresponding cells 62 and receivers 56. Yet further, it may be better seen in FIG. 6 that wire leg 52 is a U-shaped piece of wire which is brazed or soldered to inner band 44 and outer band 46 which, together with loop 70, define a track 36 for retaining cell 62 after dislodgement from receiver 56. FIG. 6 also shows the exit aperture 40 defined by bag spreaders 48 at the ends of outer band 46. The wire mesh 106 acts as a guard against placement of foreign objects through extractor hub 90. Returning to FIG. 2, a collection bag 108 is mounted on bag spreaders 48, 50 and includes an elasticized rim 110 which, in conjunction with bag spreaders 48, 50, holds collection bag 108 beneath exit aperture 40.

Figure 7:
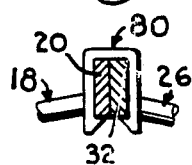
FIG. 7 is a partial sectional view along line 7—7 of FIG. 2 showing the attachment clip for securing the housing to the original, rear grille of the fan.

In operation, housing 24 is substituted for the conventional front grille of electric fan 12. Ring 32 mates with rim 20, which are then secured by clip 80 as shown in FIGS. 2 and 7. Propeller 14 is preferably configured so that, when rotated on shaft 112 as shown in FIG. 3, an airstream is generated which extends in a direction substantially forwardly from propeller 14 toward housing 24. The airstream 114 thus generated flows in a line substantially forward along the axis of rotatable shaft 112 toward housing 24. The periphery of the airstream 114 lies adjacent but includes the area defined by the housing, and as is shown in FIGS. 2 and 3, the individual cells 62 are placed at the periphery of the airstream 114 thus generated, conventionally where the greatest volume of airflow is generated.

Prior to use, the individual cells 62 are placed in a freezer in order to chill and thus solidify the phase-change material 64 contained therein. Once the phase-change material 64 is completely chilled and solidified, the cells 62 are removed from the conventional freezer and inserted through inlet 38 into track 36. Once in track 36, the spherical cells 62 are permitted to roll along inner band 44 until adjacent respective and desired receivers 56. The cells 62 are stopped adjacent the receivers by human finger inserted through openings 54 at preselected locations along track 36 adjacent receivers 56. Once stopped by the user's finger, the cells are press fitted into selected receivers until all of the receivers 56 are provided with cells 62.

Thereupon, the fan is energized so that shaft 112 and thus propeller 14 rotate, generating an airstream 114 of air to be cooled across cells 62. It will be appreciated from the configuration of the air temperature regulator 10 hereof, that a substantial volume of the air flow radially interior to cells 62 flows uninterrupted, thus providing both a flow of air that is cooled by the cells 62 as well as a flow of air that is unimpeded by the cells 62 or other structure of the housing.

After the cells 62 have been exposed in the airstream for a sufficient length of time, the phase-change material 64 will change from solid to liquid and gradually absorb heat from the airstream 114 passing thereby. Because the cells 62 are preferably spherical, and thus present a minimum amount of surface area for their volume, they not only present a somewhat airflow-smoothing configuration but also absorb heat over a longer period of time than cells of other shapes. The cells 62 will thus absorb heat from the airstream 114 until only a minimum temperature differential exists between the phase-change material 64 and the surrounding atmosphere, thus requiring new cells to be substituted in the receivers 56.

At this point, the user of the fan may extract the cells 62 from the receivers by pulling on handle 78. The user places his or her thumb on thumb rest 76 while grasping handle 78, thereby shifting cell extractor unit 30 forward with respect to cell securing unit 28. Once extractors 72 engage cells 62 within receivers 56, the cells are gradually urged forward until released from receivers 56. Pulling on handle 78 causes all the extractors 72 to move forward simultaneously, thereby releasing cells 62 from receivers 56 simultaneously. Because cells 62 are in compression fit with receivers 56, the cells 62 will generally pop out of the receivers 56.

Once released from the receivers 56, the cells 62 are free to roll along track 36. The cells 62 continue to prolapse along track 36 until reaching exit aperture 40. Upon reaching exit aperture 40, the cells fall downwardly into collection bag 108 which is secured by elasticized rim 110 on the housing. Once all the cells 62 are received within the collection bag 108, the cells 62 may be emptied into a suitable tray for refreezing while a second, substitute set of frozen cells 62 are inserted into the housing 24 hereof.

By the construction recited hereinabove, a portion of the airstream 114 generated by the fan is cooled by cells 62 while a portion of the airstream 114 lying interior to a perimeter defined by cells 62 continues in a substantially unimpeded path toward the person to be cooled. The airstream 114 thus generates a satisfying breeze as well as a cooled stream of air on a particular subject, without the necessity of cooling the entire volume of air within the room. By such manner, the recipient may have the benefit of a cooling breeze without paying the high cost of cooling an entire room or structure. Several sets of cells 62 may be used and substituted as needed in order to maintain a sufficient supply of chilled cells according to the environment of operation.

While I have described the preferred embodiment of my invention hereinabove, it may be appreciated that many variations of composition and structure may be substituted within the intended scope of this invention.

Accordingly, what I claim as being new and desire to be protected by Letters Patent is:

1. A temperature controlling apparatus for attachment to a fan having rotatable propeller for generating an air stream, said apparatus comprising:
   a plurality of individual cells containing a phase-change material therein; and
   a housing adapted for mounting to said fan, said housing including means for releasably securing said cells in said airstream and having motive means for selectively releasing said cells from said securing means in said housing,
   said individual cells being arrayed peripherally in said airstream and defining an annular, substantially uninterrupted airway between said cells and said motive means.

2. A temperature controlling apparatus as set forth in claim 1, wherein said cell is substantially spherical.

3. A temperature controlling apparatus for attachment to a fan having a rotatable propeller for generating an airstream, said apparatus comprising:

at least one individual cell containing a phase-change material therein; and a housing adapted for mounting to said fan, said housing including means for releasably securing said individual cell in said airstream and having motive means for selectively releasing said individual cell from said securing means in said housing, said housing including structure defining cell-receiving track means for receiving said cell therein and locating said cell adjacent said securing means, said track means being oriented in an arcuate path substantially transverse to said airflow.

4. A temperature controlling apparatus for attachment to a fan having a rotatable propeller for generating an airstream, said apparatus comprising:

at least one individual cell containing a phase-change material therein; and a housing adapted for mounting to said fan, said housing including means for releasably securing said individual cell in said airstream and having motive means for selectively releasing said individual cell from said securing means in said housing, said housing including structure defining cell-receiving track means for receiving said cell therein and locating said cell adjacent said securing means, said housing including an exit aperture at the bottom thereof, said track being in communication with said exit aperture whereby gravity acting on a cell unsecured by said securing means causes said cell to prolapse along said track and exit said housing.

5. A temperature controlling apparatus for attachment to a fan having a rotatable propeller for generating an airstream, said apparatus comprising:

a plurality of individual cells containing a phase-change material therein; and a housing adapted for mounting to said fan, said housing including means for releasably securing said cells in said airstream and having motive means for selectively releasing said individual cells from said securing means in said housing, said securing means including a plurality of radially extending arms connected to a plurality of cell-securing receivers, said motive means including a plurality of radially extending spokes connected to a plurality of extractors, said extractors being aliqned with said receivers for releasing said cells from said receivers upon actuation of said motive means.

6. A temperature controlling apparatus as set forth in claim 5, wherein said extractors are shiftable relative to said receivers.

7. A temperature controlling apparatus as set forth in claim 6, wherein said motive means includes means for biasing said extractors away from said receivers.

8. A temperature controlling apparatus as set forth in claim 6, wherein said motive means includes means for biasing said extractors away from said receivers.

9. A temperature controlling apparatus as set forth in claim 5, wherein said housing includes a grille positioned downstream from said airflow and said cells, said grille including a plurality of fan guards defining openings aligned with and adjacent said receivers of a sufficient width to accommodate a human finger therein.

10. A temperature controlling apparatus as set forth in claim 5, wherein said extractors are oriented for substantially simultaneous release of said cells from said receivers.

* * * * *